May 4, 1926.

R. E. S. VENABLES 1,583,750

AUTOMATIC DIRECTION OF TRAVELING BODIES

Filed Dec. 9, 1920     7 Sheets-Sheet 1

Inventor
Robert E. S. Venables
By
Attorney

Fig. 2.

Inventor
Robert E. S. Venables

Patented May 4, 1926.

1,583,750

UNITED STATES PATENT OFFICE.

ROBERT EDWARD STOPFORD VENABLES, OF LONDON, ENGLAND.

AUTOMATIC DIRECTION OF TRAVELING BODIES.

Application filed December 9, 1920. Serial No. 429,572.

*To all whom it may concern:*

Be it known that I, ROBERT EDWARD STOPFORD VENABLES, a subject of the King of Great Britain, residing in London, England, have invented certain new and useful Improvements Relating to the Automatic Direction of Traveling Bodies, of which the following is a specification.

My invention relates to the process of sorting vehicles into groups and to their marshalling in a desired order by motion on their wheels along set paths. It is chiefly useful in railroad sorting and marshalling yards, but is also useful in the movements of railroad vehicles to berths and in those of vehicles on the floors of warehouses.

The objects of the invention are to allow one vehicle to follow another in the same path at a shorter interval of time than is now possible with safety by automatically preventing it from overtaking a vehicle ahead, or from arriving at facing points before they are completely re-set for it, to arrest automatically any vehicle which enters in error a track other than that for which it is intended, and to enable the advance into a common track or gathering line of one of a number of vehicles in several tracks to be caused automatically by a preceding vehicle.

According to my invention the advance of a vehicle is automatically controlled by the system used in electric railways wherein the track is divided into sections by the provision of stationary devices comprising a longitudinal conductor in corresponding separate sections, and wherein a trolley or brush touching this conductor, together with other co-operating devices travels with each vehicle or locomotive causing its advance to depend upon the connection of a section of the conductor with electric supply, and also causing this connection to be made or broken.

But a railway yard may receive any vehicle from any district, and, therefore, according to my invention, the said devices which travel with the vehicle are not permanently mounted upon it but are carried on a carriage temporarily engaged with it during the sorting or marshalling process only, and thus constitute, equally with the stationary devices the permanent equipment of the yard.

In order that such a carriage and its traveling devices may be used over and over again with one vehicle after another as often as possible, it is formed and guided so that it can, like known forms of "car dumpers", arrive abreast of an unsorted vehicle for engagement therewith, quit a sorted vehicle after disengagement therefrom, and pass any vehicle in the same or adjacent tracks with which it is not engaged. Such a path may be overhead, underground, or at the side of the vehicle. The carriage is provided with means for ready engagement by hand with a vehicle, brakes on wheels or rails operated by current from a trolley or brush in contact with the sectional conductor and such rubbing contacts, switches and relays as are required for the system. The carriage wheels are preferably revolved by a motor capable of propelling the carriage and a vehicle with which it is engaged, automatically from its place in an unsorted train to its place in a sorted train; and the carriage preferably also carries parts adapted to be set by hand at the beginning of this automatic sorting journey so as to set the points for the vehicle as these are approached, in addition to carrying the devices which carry out the objects of the present invention. If the points are set by automatic motors started by the touching of an electric contact on the track by a contact on the carriage, which contact is connected with one of several points of different potentials in an electric supply circuit, then many of the devices which act to set the path also act for the purposes of the present invention as described below.

In the apparatus to be described the known connection of a section of conductor with supply by traveling parts is effected in a manner having novel features especially suitable for the conditions of a railroad yard. Each section is connected in the supply through two independent switches in series; one is closed only if a carriage arrives at the section, the other is closed only if the preceding carriage has passed beyond the section next ahead. As a carriage passes from one section to another the first is not disconnected from supply before the connection of the second is well established by rubbing contacts and the action of relays. Relays which are required to be held in position after their coils cease to be energized through rubbing contacts may be so held without the use of detents or the like requiring careful mechanical adjustment.

In the accompanying drawings:—

Figure 1:
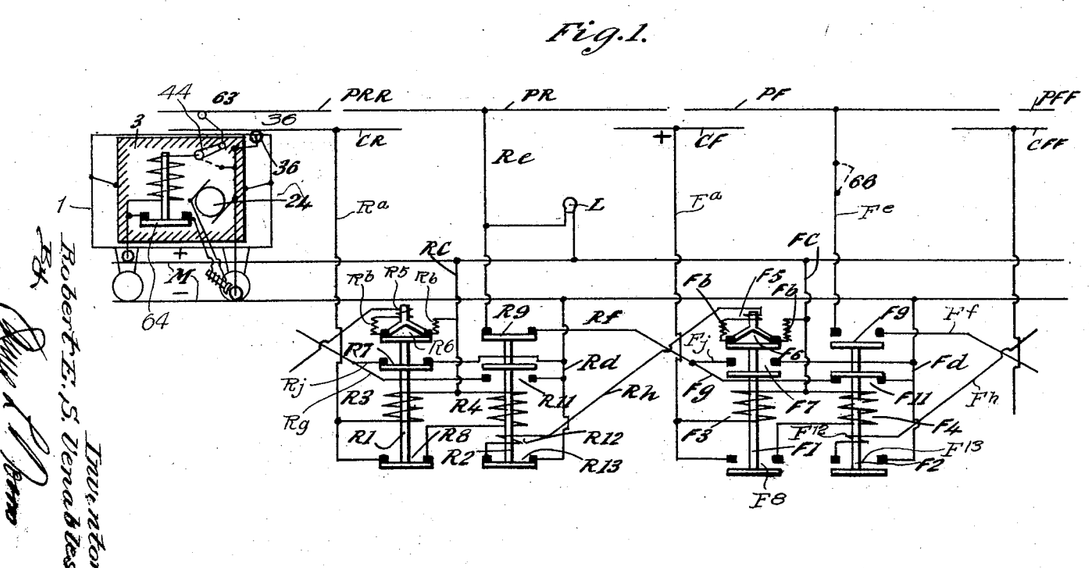
Fig. 1 shows diagrammatically a vehicle and a carriage approaching two sections of conductor and the relay serving these sections.

In Fig. 1 the shaded rectangle 3 represents a carriage traveling from left to right; the rectangle outside of the shaded rectangle represents a vehicle engaging with the carriage; M+ and M— are the mains of an electric supply and where the carriage is propelled by an electric motor these mains are preferably a live rail or wire and the track rails respectively of the carriage or vehicle track. In this case 24 is the propelling motor whose circuit is completed when relay 64 is energized. 44 is a hand switch connecting the relay winding to brush 63 for normal or automatic control; in the dotted position the relay can be energized under hand control. 83 is a brake block on the track wheel, normally pulled on by a spring, not shown, and pulled off by the solenoid 84 energized by current when the relay switch 64 is closed and the motor circuit is thereby closed.

Brush 63 is in contact successively with separate sections of wire such as PRR, PR, PF, PFF and the like, and the carriage is therefore propelled or not accordingly as the wire with which brush 63 is in contact is or is not connected to main M—. The purpose of the arrangement of relays now to be described is this: when a carriage approaches the rearward wire PR of two wires it prepares the connection of section PR to main M— for its own propulsion, but this is not completed if another carriage is still in contact with the forward wire PF, and therefore the rearward carriage comes to rest. When the forward carriage has moved past the beginning of the next wire section PFF it causes the completion of the connection of section PR to main M— and so allows the following carriage to proceed. Each separate wire section therefore corresponds with a "block section" in the track.

In all figures a relay is conventionally represented thus; a pair of contacts (to be joined by a switch) is represented by two black squares; a switch joining these when touching them is represented by a short oblong; the solenoid core and stalk which carries and displaces these switches are represented by a long oblong, surrounded by the energizing coil. Current through this coil displaces the switches, usually upwards so that gravity opposes the solenoid; when the drawing requires the relay to be represented horizontal, the relay is spoken of as being "up" when it is in the energized position. In Fig. 1, $F^2$ refers to the entire relay of which $F^4$ is the coil, and the switches $F^9$ and $F^{12}$ close on to the fixed contacts on rising, and $F^{11}$ rises off its fixed contact.

Pairs of relays $R^1$, $R^2$ and $F^1$, $F^2$ are fixed near the track and interconnected as shown. A similar pair serves every separate section of wire such as PR or PF. Consider a carriage 3 approaching from the left, with no carriages in advance of it. Only wire PRR is alive, and between it and PR is a short control strip CR connected with relay $R^1$. When brush 36 on the carriage which is connected to main M—, is in contact with CR it energizes coil $R^3$ of relay $R^1$, whose other end is connected with main M+ through lead $R^e$ and relay $R^1$ in rising closes switches $R^7$, $R^8$ and so energizes coil $R^4$ whose other end is also connected with main M+. Relay $R^2$ in rising closes two switches; first $R^{13}$ which closes the circuit of holding-on coil $R^{12}$ (otherwise completed by leads $R^d$, $R^h$, coil $F^5$, flexible wires $F^b$, switch $F^6$ and lead $F^c$) and second, $R^9$ which connects section PR to main M— by leads $R^e$, $R^f$, $F^s$, $F^{11}$ and $F^d$. These circuits being once made are unaffected by relay $R^1$ dropping owing to bad contacts or when brush 36 arrives at the end of strip CR. Propulsion is now continued. When brush 36 is in contact with strip CF the relays $F^1$ and $F^2$ rise and make similar connections: section PF is connected with main M— and section PR is not yet disconnected. Next brush 36 leaves strip CF with the following results: coil $F^5$ is de-energized and relay $F^1$ falls breaking the connection of section PR with main M— at switch $F^7$, and temporarily breaking the circuit of holding-on coil $R^{12}$ at switch $F^6$ thus: the contacts of switch $F^6$, instead of being fixed are on a solenoid core represented by the inverted Y shown; this is normally resting on the switch $F^6$ and as switch $F^6$ rises (i. e. moves towards the said contacts) the aforesaid solenoid moves further into the field of a holding coil $F^5$ which is in series with holding coil $R^{12}$ and also with the switch $F^6$ itself. Hence when relay $F^1$ is de-energized, the aforesaid solenoid core is held from following it and switch $F^6$ leaves its contacts thereby opening the holding circuit of the solenoid so that the current dies away simultaneously in coil $R^{12}$ and in coil $F^5$ and the circuit cannot be re-made at switch $F^6$ before it has been broken at switch $R^{13}$ by relay $R^2$ falling to de-energized position. At this position the motion control of carriage 3 causes its propulsion from section PF and permits the propulsion of a following carriage from section PRR, but prevents it from being continued from section PR. Such a following carriage may arrive at and pass the strip CR, but as section PR is "dead" its motor circuit is not kept closed, its brakes are not held off, and it comes quickly to rest and it remains at rest until the leading carriage 3 has cleared the strip CFF. Up to that point the circuit connecting section PR with main M— was closed at switch $R^9$ but opened at switch $F^7$ (which fell when brush 36 left strip CF). Brush 36 coming into contact with strip CFF does not affect this, but the breaking of this contact lets relay $F^2$ fall and close switch $F^{11}$ so that the following carriage $3^1$ is propelled from section PR because the breaking of the contact of brush 36 with strip CFF has exactly the effect in opening the circuit of the holding coil $F^{12}$ as its breaking contact with strip CF has in opening the circuit of holding coil $R^{12}$ just described.

It will be noted that if switch $R^9$ is closed section PR is made alive through switch $F^7$ so long as relay $F^1$ is up, which is as long as brush 36 is in contact with strip CF, and alternatively through switch $F^{11}$ when both relays are down, but section PR cannot be alive when relay $F^1$ is down and relay $F^2$ is up. By arranging that section PR is cut off from main M— only when brush 36 ceases to contact with strip CF an overlap is ensured, both sections PR and PF being alive whilst brush 36 is in contact with strip CF.

The progress of each vehicle may be conveniently indicated in a central control room by connecting any electric indicator such as a lamp L, Fig. 1, between, say, lead $R^e$ and main M+.

The length of the separate sections of wire PR, PF is that of the length of the "blocks" into which it is desired to subdivide a track; these must be long enough to accommodate the greatest number of vehicles which are coupled and controlled as one, and to allow them to come to rest within the "block" if the wire is "dead".

As already stated, the advantages of my invention are obtained more fully if junction devices such as points are set by automatic means; and if these are caused to operate by the method described in my application for United States Letters Patent Serial No. 429,571 filed December 9, 1920, the further advantage is obtained that the same parts operate for setting the path and for controlling the motion of a vehicle over a junction.

Figure 2:
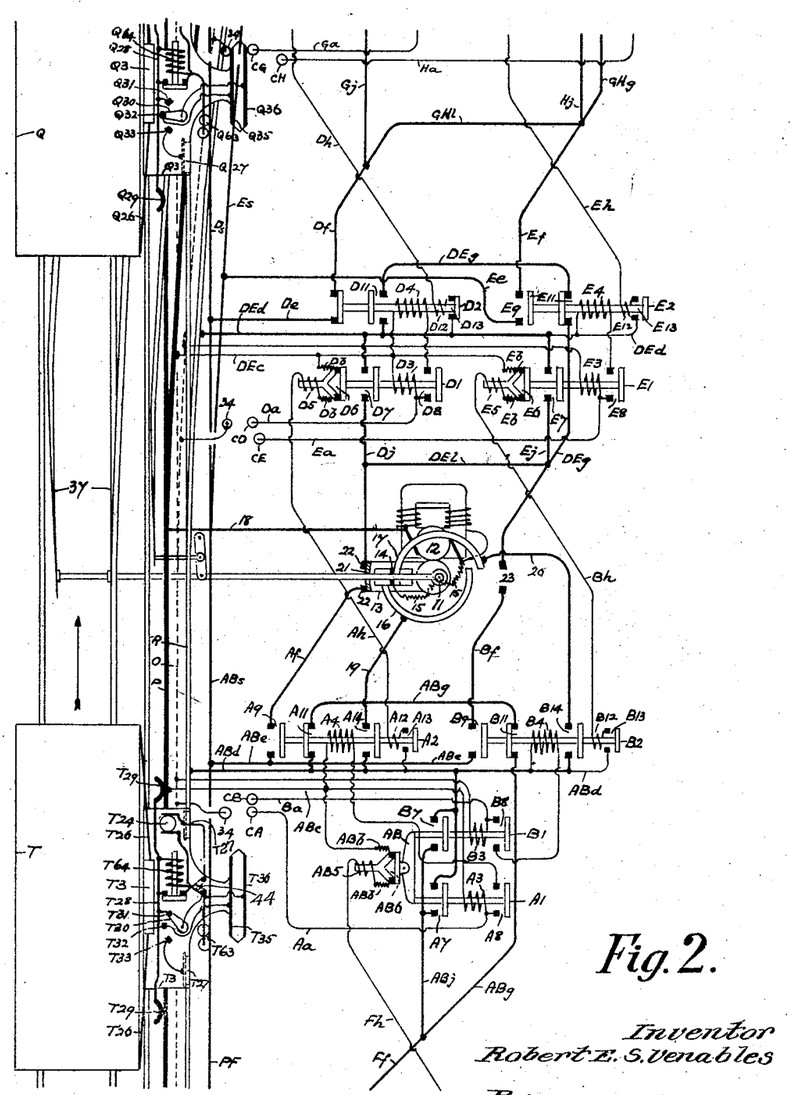
Fig. 2 continued by Fig. 3 shows the plan of a bifurcation of railway tracks and of three vehicles, and diagrammatically the carriages, relays, and point motor which cooperate to set the path and control the motion of the vehicles.
Figure 3:
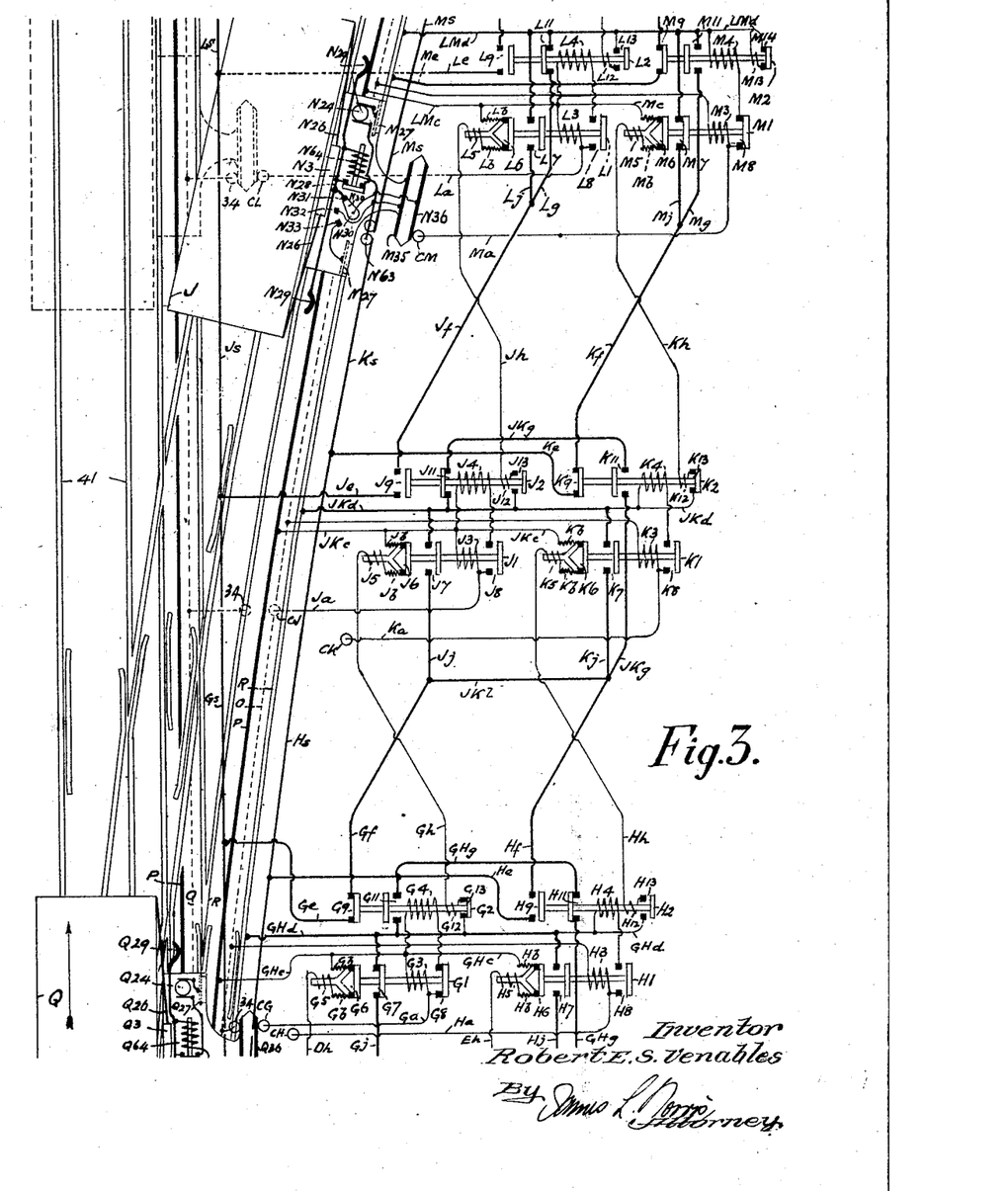

In Figs. 2 and 3, 41 are the rails of a throw-off line and 38 are those of a siding joined to it by points 37. N is a vehicle which has arrived at the clearing point in this siding where a vehicle on the throw-off line can pass it. Q is a vehicle on the throw-off line, and T is one approaching the points; all move with the arrow.

Vehicle T is controlled by the cables $T^{26}$ engaging it with carriage $T^3$ which is guided by track rails R and carries a relay $T^{64}$ the coil of which is connected by one end through lead $T^{28}$ to brushes $T^{29}$ on positive rail P, and by the other end to brush $T^{63}$ on the sectional conductor PF. Therefore, when the section is connected by the control system to negative main R the relay $T^{64}$ closes the circuit of propelling motor $T^{24}$ whose other terminal is connected to negative main R by track wheel $T^{27}$. Current in the same circuit may hold off the brakes. $T^{36}$ is a rubbing strip contact corresponding to the contact 36 in Fig. 1, and is connected to a switch $T^{30}$ which can be set by hand in one of three positions when the carriage is engaged with the vehicle; it connects strip $T^{36}$ to positive main P if it touches contact $T^{31}$, to negative main R if it touches contact $T^{33}$; while if it touches contact $T^{32}$ it connects strip $T^{36}$ through strip $T^{35}$ to the neutral contact 34 when it is used.

The carriages engaged with vehicles Q and N are similar and it is to be understood that these are shown diagrammatically without any attempt to indicate the construction which enables a carriage to clear a passing vehicle.

Unlike brush 36 in Fig. 1, therefore, strip $T^{36}$ here can be connected by the action of an attendant at the starting point of the sorting journey with any of three points of different potential on the supply system, hereinafter referred to as "potential points", viz, the positive, neutral and negative mains of an ordinary three-wire supply. The reason for this is that in the example chosen, the vehicles are to enter one of three sidings, of which one is shown in Figs. 2 and 3, while the other two are beyond the limits of these figures and the track leading to them is referred to as the throw-off line.

As will be described, the points are set for the first siding by strip $T^{36}$ being connected to the positive main P and for the second and third sidings by $T^{36}$ being connected to neutral and negative mains O and R respectively.

Contact $T^{36}$ is connected to positive main because this vehicle is to follow the siding; if it were to follow the throw-off line, contact $T^{36}$ would be connected to neutral or negative main. When contact $T^{36}$ touches contact CA no action results because this is also connected through lead $A^a$ and relay coil $A^3$ to positive main P; but when contact $T^{36}$ touches contact CB and passes beyond it, two independent results are produced: (a) section $AB^s$ is connected with negative supply and section PF is disconnected in the manner described with reference to Fig. 1; and (b) the points 37 are set for the siding.

(a) Coil $B^3$ is connected to neutral main O and therefore is energized when contacts CB and $T^{36}$ touch, relay $B^1$ rises, closing switches $B^8$ and $B^7$. Coil $B^4$ is energized thus from positive main P, contacts $T^{36}$ and CB, lead $B^a$, switch $B^8$, coil $B^4$, lead $AB^d$, negative main. This closes switches $B^9$, $B^{14}$, and $B^{13}$, and opens switch $B^{11}$ in the connection of section PF to negative main through leads $F^f$ and $AB^g$, switch $A^{11}$ and lead $AB^d$. As long as contacts $T^{36}$ and CB touch, however, the alternative connection through lead $AB^j$ is completed by switch $B^7$. When $T^{36}$ passes beyond CB, coil $B^3$ is de-energized and relay $B^1$ falls, opening switches $B^7$ and $B^8$, disconnecting section PF, and de-energizing coil $B^4$. Relay $B^2$ remains held up by holding coil $B^{12}$ energized thus: negative main, lead $AB^d$, switch $B^{13}$, coil $B^{12}$, lead $B^h$, coil $E^5$, lead $E^b$, switch $E^6$, lead $DE^c$, positive main, and therefore section $AB^s$ remains connected to lead $B^f$ through switch $B^9$ and from lead $B^f$ to negative main R thus: Switch contacts 23 are joined by switch 21 on the point motor when it has given the points the setting opposite to that shown, see (b) below: lead $DE^g$, switch $E^{11}$, lead $DE^g$, switch $D^{11}$, when this is closed by relay $D^2$ being released by carriage $Q^3$ passing beyond section $D^s$, lead $D^{ed}$ to negative main R.

In cases where contact $T^{36}$ is connected to negative main, coils $A^3$ and $B^3$ are energized. But while switch $A^8$, by closing, energizes coil $A^4$ which is connected through lead $AB^c$ to positive main, the closing of switch $B^8$ does not energize coil $B^4$. Again, in cases where contact $T^{36}$ is connected to neutral main, coil $B^3$ is not energized but coils $A^3$, $A^4$ are energized so that while contacts $T^{36}$ and CA touch the section PF remains connected to supply through leads $F^f$, $AB^j$, switch $A^7$ (in parallel with switch $B^7$) and when $T^{36}$ passes beyond CA this connection through lead $AB^j$ is broken at switch $A^7$, and that through lead $AB^g$ is broken at switch $A^{11}$ (in series with $B^{11}$); also section $AB^s$ is connected to negative main.

Fig. 1, representing two normal sections of track may be considered as being continued by Fig. 2, and as continuing the siding in Fig. 3 or the throw-off line up to the next points. The control contacts are inverted in the two examples: In Fig. 1, 36 is a brush and CR is a strip, whilst in Fig. 2, $T^{36}$ is a strip and CA, CB are brushes. As in Fig. 1 the circuit of the holding coil $R^{12}$ is broken by the fall of relay $F^1$, so the circuit of the coil $F^{12}$ in Fig. 1 is broken by the fall of either relay $A^1$ or $B^1$ in Fig. 2. This circuit is similarly completed through switch $AB^6$, flexible leads $AB^b$ and holding coil $AB^5$ common to both relays $A^1$ and $B^1$, switch $AB^6$ being on a lever AB and so raised and lowered with either relay.

(b) The points 37 are set in a known manner by the revolution of crank pin 11 through 180° by motor 12 of which one terminal is connected to positive main by lead 18, and the other by leads 15 (including a rotating connection) to contact 14 sliding in arm 13 which revolves with crank pin 11, and pulled towards the axis by a spring. As shown set for vehicle Q, contact 14 rests on eccentric conductor 17 whose connection with negative main through lead 20 is broken at switch $B^{14}$. When relay $B^2$ is raised by contacts $T^{36}$ and CB touching, the switch $B^{14}$ connects conductor 17, and therefore motor 12, with negative main by lead $AB^d$; the motor revolves the crank pin 180° until current is cut off in a known manner by contact 14 passing over the end of conductor 17 on to conductor 16 which is not connected with supply.

The vehicle is prevented from advancing if the points are not completely set, because lead $A^f$ cannot be connected with supply unless contacts 22 are joined by revolving switch 21, nor can lead $B^f$ be so connected unless contacts 23 are so joined; in either case section $AB^s$ remains disconnected.

The pairs of relays $D^1$, $D^2$, $E^1$, $E^2$, $G^1$, $G^2$, $H^1$, $H^2$, $J^1$, $J^2$, $K^1$, $K^2$, $L^1$, $L^2$ and $M^1$, $M^2$, act in the same way as do $F^1$, $F^2$ of Fig. 1, but the following features in their connection have to be described.

Until a vehicle arrives at the position of N or the corresponding position shown dotted on the throw-off line, a following vehicle must be prevented from overtaking it on either track. Hence, except when the non-holding relays are temporarily energized section $AB^s$ is disconnected if relay $D^2$ or $E^2$ is up, its only connection being through switches $D^{11}$ nad $E^{11}$, connected in series by lead $DE^g$. Similarly, both section $J^s$ and $K^s$ are disconnected if relay $J^2$ or $K^2$ is up, switches $J^{11}$ and $K^{11}$ being connected in series by lead $JK^g$. The arrangement is similar with the other sections: lead $D^f$ is joined to lead $GH^g$ by lead $GH^1$, and $G^f$ to $JK^g$ by $JK^1$. This interconnection is not repeated in further sections, and switches $L^{11}$ and $M^{11}$ are not in series.

The connection of a carriage contact such as $T^{30}$ with the positive, neutral or negative main according to the path the vehicle is to follow causes the arrest of the vehicle if it enters another path, independently of whether the same connection is or is not employed also to set the points by the method described in my application for United States Patent, Serial No. 429,571, filed December 9, 1920, according to which, for example, if contact $T^{36}$ is connected with the positive main, points are set for the carriage and vehicle to enter the first of three sidings; if contact $T^{36}$ is connected with the neutral main, points are set for them to enter the second siding; and if contact $T^{36}$ is connected with the negative main, points are set for them to enter the third siding. It is, however, an advantage of combining the two inventions that many of the devices carry out both objects. If contact $T^{36}$ is connected to positive main as shown, and the points, whether operated as shown or by hand, remain set for the throw-off line in error, then contact $T^{36}$ will touch contact CD instead of CE. The result will be that neither relay $D^1$ nor $D^2$ will be energized and section $D^s$ will remain disconnected, and the vehicle begins to come to rest as soon as brush $T^{63}$ passes into this section. Similarly, section $E^s$ remains disconnected if contact $T^{36}$ is connected to neutral or negative main, and if the points are set for the siding so that contact CE is touched instead of contact CD. For its connection to neutral fails to energize relay $E^1$ and therefore relay $E^2$ also; and its connection to negative, although energizing relay $E^1$ fails to energize relay $E^2$.

The sections of the throw-off line to the left of $AB^s$ may be provided with two pairs of relays each, but preferably, one pair is caused to act as do those of Fig. 1, whatever the setting of switch $T^{30}$ by an arrangement such as the following. The relay coils are connected to neutral main instead of to positive main as in Fig. 1. Both relays are therefore energized whether switch $T^{30}$, Fig. 2, is set to touch contact $T^{31}$ (positive) or $T^{33}$ (negative). When it is set to touch $T^{32}$ they are both energized by providing contacts 34 on these sections connected to either positive or negative mains instead of to neutral as shown for sections $AB^s$ and those to the right of it.

In the case of the end section of a siding in which a vehicle is to be arrested while others arrive behind it, a hand switch 66, Fig. 1, may be inserted between the conductor section PF and supply and left open until these vehicles are to advance.

Figure 4:
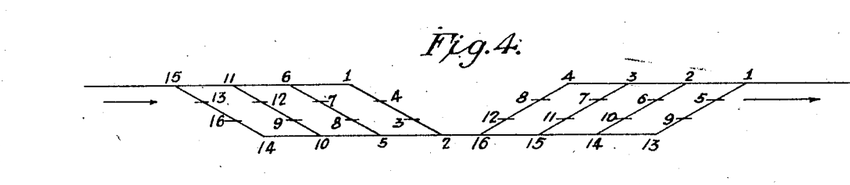
Fig. 4 shows the positions of vehicles in the ordinary process of marshalling by two "gridiron" or "ladder" sets of sidings.

In Fig. 4, each numeral shows the order in which the vehicle occupying that position is to leave the second gridiron. Arriving from the left in any order each vehicle passes to one of the first four sidings according to whether its number in the desired order is 1 to 4 inclusive, 5 to 8, 9 to 12, or 13 to 16, as shown, and the leading vehicle is arrested in the end section by the opening of a switch such as 66 in Fig. 1. When each siding is to be cleared, this switch is closed and vehicles 2, 3, 4, 1 pass to the end sections of the sidings of the second gridiron and are similarly arrested in them. By closing switch 66 of the next siding vehicles 5, 8, 7, 6 follow and so on.

Figure 5:
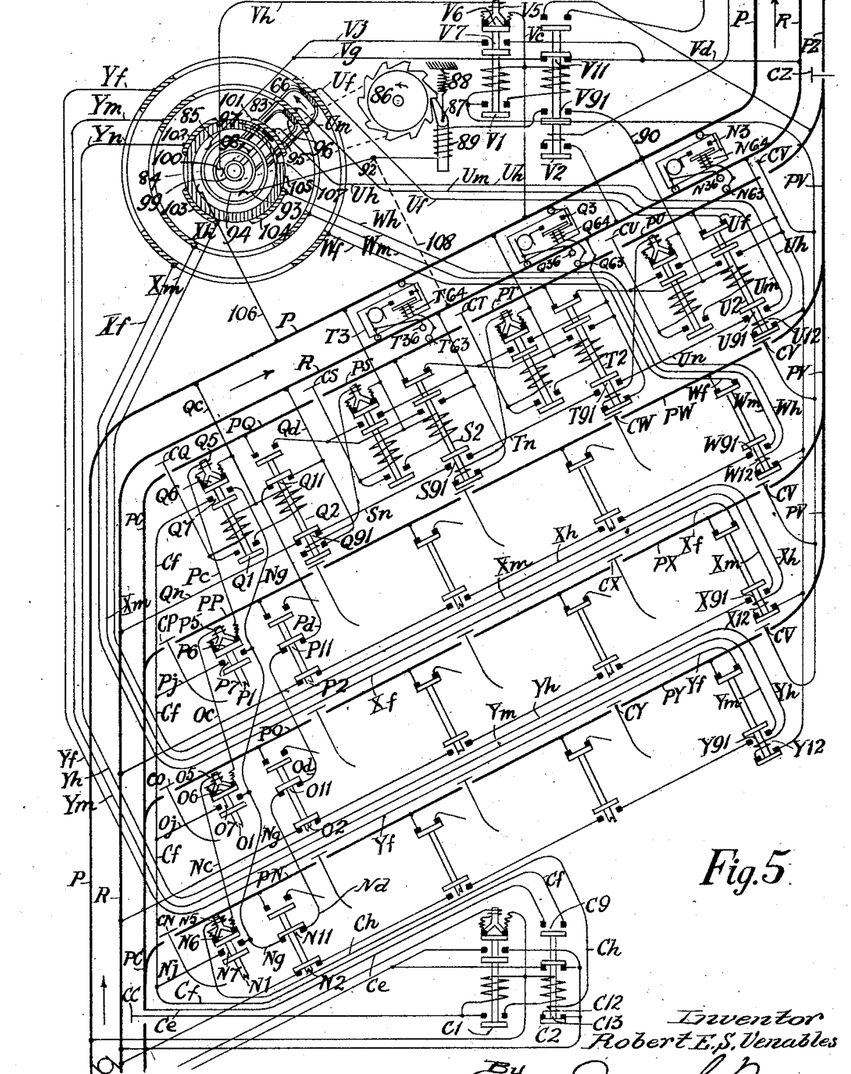
Fig. 5 shows one arrangement whereby only the vehicles in one siding of the first "gridiron" can advance, and when all have left it, those of another siding are automatically released.

In Fig. 5, P is the positive and R is the negative supply main. PC is the section of conductor for a "throw-off" line of railroad out of which four marshalling sidings are led, and PN, PO, PP, PQ are the first sections of conductor for each of these sidings, of which the final sections are PU, PW, PX, PY, and all have two intermediate sections similar to PS and PT. PV is the section of the "gathering line" into which the four sidings lead, and PZ is the first section of conductor of the single line beyond it.

The equipment of each siding is as shown for the sections PQ to PU, which is similar to that of Fig. 1, but for the sake of clearness only those parts are shown whose action will be referred to.

In the use of either group of sidings in Fig. 4, the vehicles remain in one group until it contains a train or until one siding is full. The process required for the first group is effected by the automatic operation of the arrangement now to be described.

All the vehicles issue from one siding before any issue from the other sidings, and the passage of the last vehicle from any siding causes the issue of those from another siding to begin. The process required for the second group of sidings in Fig. 4 is effected by a modification to be described subsequently. $T^3$, $Q^3$, $N^3$ represent diagrammatically the carriages engaged with the vehicles in the three sections having conductors PS, PT, PU. The vehicles are not shown, nor are the track rails, wheels, and brakes, but these may be similar to those shown in Figs. 2 and 3 and are supposed to occupy the sections behind PW, PX and PY as well as those behind section PU. The advance of a carriage over one section controlled by the connection of that section of conductor with negative main R is exactly as in Fig. 1. As each carriage arrives, traveling with the arrow, its contact such as $T^{36}$ touches contact CC thereby energizing relays $C^1$ and $C^2$ and closing switch $C^9$ in the connection $C^e$ of common section PC to main R. As this connection must be made temporarily while contact $T^{36}$ touches any of the contacts CN, CO, CP or CQ it is made through any of the switches $N^7$, $O^7$, $P^7$ or $Q^7$ connected in parallel between leads $O^f$ and $N^g$. Further, this connection must be broken if any of the holding relays $N^2$, $O^2$, $P^2$ and $Q^2$ are unreleased, and therefore lead $N^g$ is connected with main R through switches $N^{11}$, $O^{11}$, $P^{11}$, $Q^{11}$ joined in series by leads $N^d$, $O^d$ and $Q^d$. The holding relay $C^2$ has to be released by the deenergizing of any of the non-holding relays $N^1$, $O^1$, $P^1$, $Q^1$, and consequently its holding coil $C^{12}$ and switch $C^{13}$ are connected to main P through lead $C^h$, and the following in series: coil $N^5$, switch $N^6$, lead $N^c$, coil $O^5$, switch $O^6$, lead $O^c$, coil $P^5$, switch $P^6$, lead $P^c$, coil $Q^5$, switch $Q^6$, lead $Q^c$. To arrest vehicles in the four sidings, the head sections PU, PW, PX, PY are disconnected from main R by a switch 66 as in Fig. 1, but this is here connected as follows:—Revolving switch 66 connects by conductor 83 with ring 84 rubbed by brush 85 and so to leads $V^j$, $V^g$ which form alternative connections with main R (as in Fig. 1) through switches $V^7$, $V^{11}$ and lead $V^d$. In the position shown, switch 66 touches a contact on the end of lead $U^f$ and so connects main R with section PU. If turned 90° counterclockwise, switch 66 touches a contact on the end of lead $Y^f$ and similarly connects section PY with main R. And when switch 66 touches contacts in the ends of leads $X^f$ and $W^f$ it similarly connects main R with sections PX and PW, respectively. By setting switch 66 clear of these four contacts, each of the head sections is rendered "dead," and the first carriage to arrive in it is arrested and renders the section behind it "dead," so that the following carriage stops there, and so on, but when the vehicles have to be passed from the first "gridiron" of Fig. 4 to the second, then by setting switch 66 by hand in the position shown, carriage $N^3$ is caused to advance over the now "live" section PU; it makes this section "dead" when its contact $N^{36}$ ceases to touch contact CV, but it makes section PT "alive" so that the vehicles issue into the common track at intervals of two sections, as already explained.

It will now be shown how switch 66 is automatically shifted from the contact in the end of lead $U^f$ to the contact on the end of lead $Y^f$ by the passage of the last carriage, and only the last carriage, from section PV to section PZ.

Switch 66 is revolved through 90° by gearing from ratchet wheel 86 when pawl 87 is raised by spring 88 and solenoid 89 becoming de-energized. The energizing circuit of solenoid 89 is from main P by lead 90, switch $V^{91}$ to terminal 92, brush 93, ring 94, conductor 95, and switch 96 which revolves with switch 66 and, in the position shown, continues the circuit by lead $U^m$, switch $U^{91}$, lead $U^n$, switch $T^{91}$, lead $T^n$, switch $S^{91}$, lead $S^n$, switch $Q^{91}$ and lead $Q^n$ to main P. Therefore although switch $V^{91}$ is closed every time that any of the contacts CV is touched by a carriage contact such as $N^{36}$, the circuit just traced is only closed if all the relays $Q^2$, $S^2$, $T^2$, $U^2$ are released, which is only when the contact $T^{36}$ of the carriage of the last vehicle in that siding has ceased to touch contact CV; when it has ceased to touch contact CZ, relay $V^2$ is released, switch $V^{91}$ opens, coil 89 de-energizes and spring 88 raises pawl 87, advancing wheel 86 and turning switches 66 and 96 counter-clockwise through 90°, so that switch 66 connects main R with section PY instead of with section PU, and switch 96 connects solenoid 89 through brush 93 through lead $Y^m$ with switch $Y^{91}$ instead of with switch $U^{91}$. In a similar manner solenoid 89 is reenergized only when all switches between $Y^{91}$ and main R are closed by the release of all those relays, and on its being again de-energized switch 66 shifts from the contact on lead $Y^f$ to that on lead $X^f$, and when the next siding is empty, switch 66 shifts to the contact on lead $W^f$, and in due course back to the position shown.

The inner switch 97 turns with switches 66 and 96 and through conductor 98, ring 99, brush 100, lead $V^h$, coil $V^5$, switch $V^6$ and lead $V^c$ it connects main P with one at a time of contacts 101, 102, 103, 104 and thereby continues the circuit just traced by lead $U^h$ to holding coil $U^{12}$, by lead $W^h$ to coil $W^{12}$, by lead $X^h$ to coil $X^{12}$, or by lead $Y^h$ to coil $Y^{12}$. In the position shown, switch 97 connects holding coil $U^{12}$ with main P so that this circuit is momentarily broken as already described with reference to Fig. 1. But the holding coils $W^{12}$, $X^{12}$, $Y^{12}$ have to be also connected with main P and this is effected by ring 105 turned with switch 97 and permanently connected with main P by brush 106; it has a gap wider than the contacts 101, 102, 103, 104, but such that when it is turned the edge 107 touches contact 101 before contact 97 leaves contact 101.

For the second group of sidings in Fig. 4 the process required is simpler than that just described for the first group; the turning of switches 66 and 97 has to occur every time a carriage contact such as $N^{36}$ ceases to touch contact CZ without awaiting the release of all relays in the siding from which that carriage has issued. This process is effected by connecting terminal 92 with main R direct by lead 108 shown dotted, and by omitting brush 93, ring 94, conductor 95, switch 96, leads $U^m$, $W^m$, $X^m$, $Y^m$ and the contacts in which they end. Switches $U^{o1}$, $W^{o1}$, $X^{o1}$, $Y^{o1}$ and all the switches and leads between these and main R.

Instead of the ratchet arrangement shown in Fig. 5 the switch 66 may be revolved by a star wheel turned by a pin on the carriage, or the ratchet may be operated by a tread rail.

It is to be observed that an attendant can, by using hand switch 44, Fig. 1, move a self-propelling carriage up to one in front of it, and so propel vehicles engaged with such carriages for being coupled together. But if automatic motion control is then restored by replacing switch 44, the vehicles separate again soon after motion is resumed, for although all of several carriages in a section will at first move on together, the first whose brush 36 leaves the next control strip, makes that section "dead" and arrests the other carriages upon it until it has cleared the strip beyond that.

An attendant can likewise manipulate switch 44 so as to use a self-propelling carriage as an independent shunting locomotive, a suitable reversing device being provided, and he can set the path control hand switches as he proceeds so as to set his path.

Figure 6:
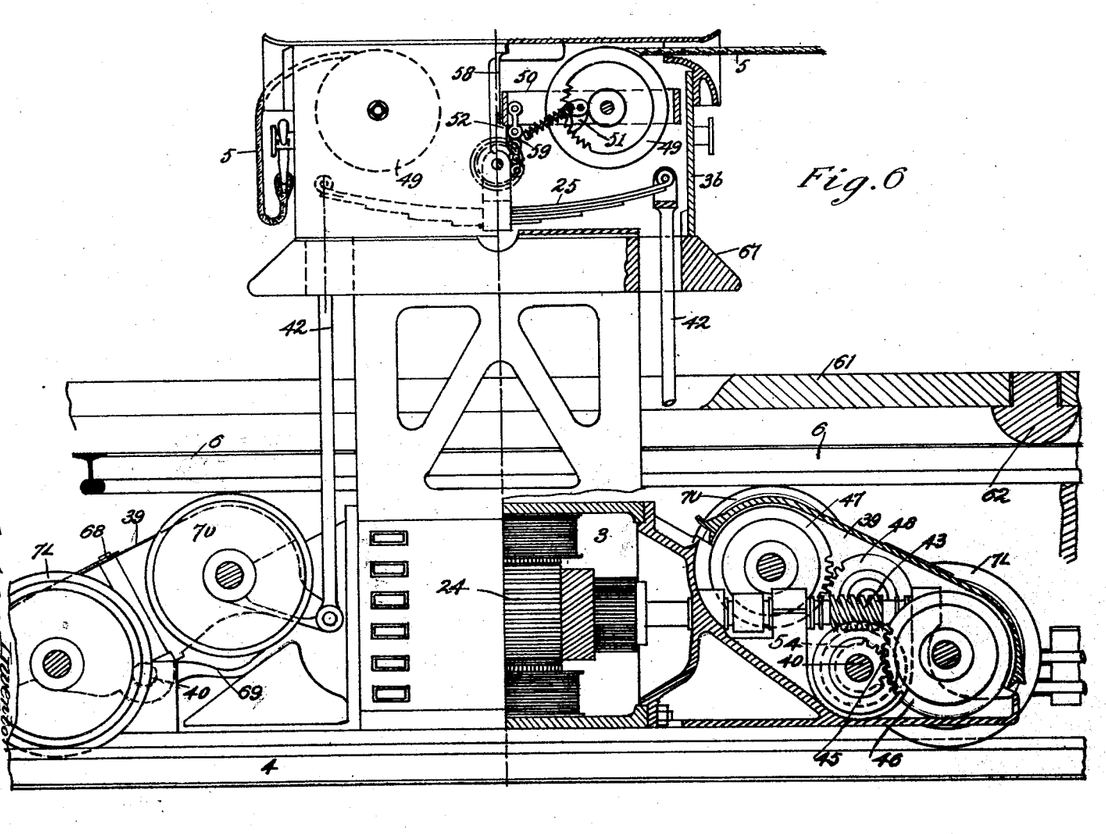
Fig. 6 is a half side elevation and half section of a carriage running in a conduit and Fig. 7 is an end view of the same.

In Fig. 6 the body 3 is supported by two bogies 39 pivoted to it on the horizontal pivots 40. The lower wheels $7^L$ are flanged and run on the rails 4; the upper wheels $7^U$ are plain and run on the rails 6 with a pressure determined by the spring 25 from which links 42 pull upwards on the bogies.

The electric motor 24 which drives the four wheels of each bogie through a worm 43, worm-wheel 54 mounted on the pivot 40, pinion 45 driving the lower spur wheel 46 directly; and a similar pinion on the other side of the worm wheel drives the upper spur wheel 47 in the reverse direction through intermediate pinion 48.

In addition to the adhesion of the four lower wheels due to dead weight, that due to the spring is arranged to increase with the tractive effort exerted. One such arrangement is shown; the carriage is engaged with the vehicle by cables 5 leading fore and aft. Each cable is unwound from a drum 49 which is then locked to a lever 50 by a pawl 51. This lever turns about the pivot of the drum and its end rests on a stop 52 adjustable by screw 58. The end of the lever is joined to the end of a similar lever by chain 59 which passes around a sprocket on the centre shackle of the leaf spring 25 and thereby forms a differential gear so that the rising of either lever raises the spring shackle. Thus the tension of the right hand cable tends to turn that lever clockwise and tension in the left hand cable tends to turn that lever counter-clockwise; both tendencies are opposed by the leaf spring. The centre of the spring being raised its ends exert increased tension on links 42 which tends to turn the right hand bogie clockwise and the left bogie counter-clockwise, so that the pressure of all the wheels on top and bottom rails is increased as desired for increased adhesion corresponding to increased tractive force, whether exerted through the cable leading aft for accelerating the vehicle, or through that leading forward for retarding the vehicle.

Figure 7:
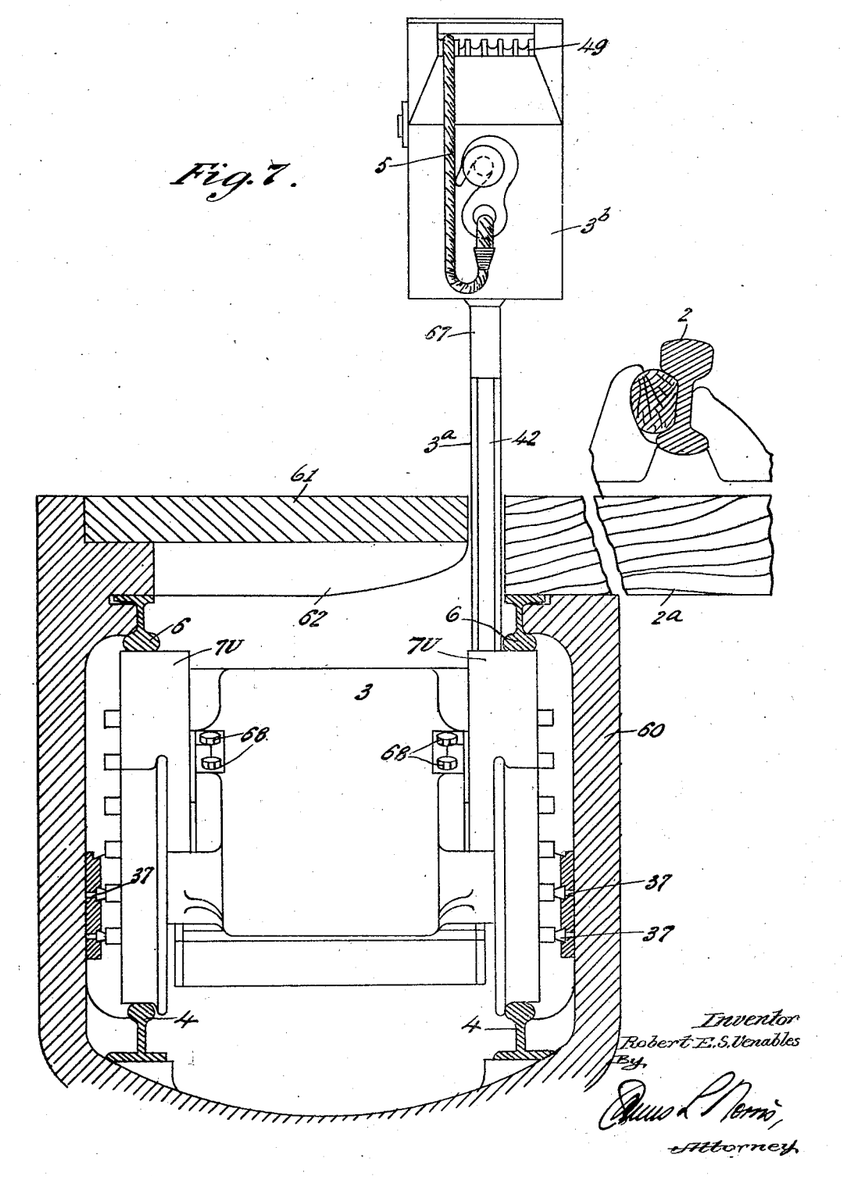
Figure 8:
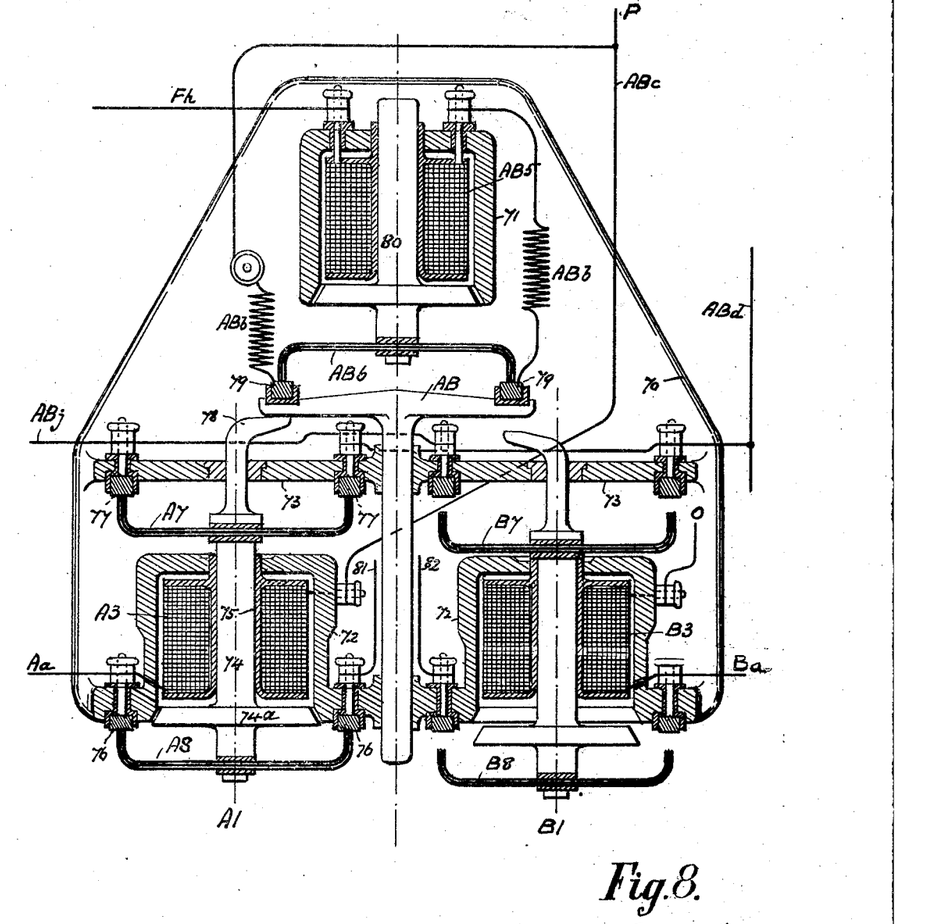
Fig. 8 is a sectional elevation of a suitable construction of a group of relays in Fig. 2.

Fig. 7 shows an end elevation of the same carriage, and cross section of the conduit, which is here adapted for a railway track of which the rail 2 is suported on the sleeper $2^a$. The reinforced concrete conduit 60 holds the upper rails 6 and the lower rails 4, and with the exception of the slot at the ends of the sleepers it is closed by removable cover slabs resting on brackets 62.

The said slot is of the standard width for passing wheel flanges on railway crossings and the frame $3^a$ which connects the body 3 with the drum casing $3^b$ crosses vehicle rails such as 2 through gaps of the same standard width and at the usual angles. A shoe 67 is provided to scrape ice from the sides of the rails at these crossings.

If necessary, the carriage can be removed from one conduit at any point by disconnecting links 42 from the bogies 39, then removing four bolts 68 in each bogie which can then be moved endways; the wheels $7^U$ are then supported on flanges 69 which at first rise so as to lift intermediate pinions 48 out of engagement with the pinions on the worm wheels.

The switches set by the atendant for path control are conveniently mounted on the drum case $3^b$. The conductors 37 for propulsion and for path and motion control are conveniently attached to the sides of the conduit, the continuous conductors being preferably the lower.

It is obvious that when the carriage is not required to propel a vehicle, but only to check or to arrest it, one of the cables 5 and its drum 49 and lever 50 could be omitted, one end of chain 59 being fixed.

Claims:

1. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electric conductor in sections on the track, a brush on the carriage which is electrically connected with the braking means and touches said conductor, and switch means for making or breaking a connection between each conductor section and the current supply which is operated by the passage of a carriage on to or beyond the section.

2. Apparatus for sorting or marshalling vehicles comprising a carriage having a body adapted to travel below the vehicle track, a connection adapted to pass through ordinary railroad crossings to means adapted to engage the carriage with a vehicle and travelling above the vehicle track, braking means adapted to arrest the carriage and a vehicle engaged with it, a conduit track adapted to guide the carriage to a position abreast of unsorted vehicles and away from a sorted vehicle, an electrical conductor in sections on the track, a brush on the carriage electrically connected with the braking means and touching said conductor, and switch means for making or breaking a connection between each conductor section and the current supply which is operated by the passage of a carriage on to or beyond the section.

3. Apparatus for sorting or marshalling vehicles, comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, a rubbing carriage contact on the carriage adapted to touch stationary contacts, holding relays energized through the carriage contact of an arriving carriage in combination with each section of conductor, a connection of a section of conductor with a current supply comprising a switch closed by the energizing of this relay and in series with a switch closed only by the release of the corresponding relay of the section next ahead.

4. Apparatus for sorting or marshalling vehicles, comprising a carriage adapted to pass any vehicle with which it is not engaged, means adapted to engage it temporarily with a vehicle, braking means adapted to arrest the carriage and a vehicle engaged with it, a track to guide the carriage to a position abreast of an unsorted vehicle and away from a sorted vehicle, an electrical conductor in sections on the track, a brush on the carriage electrically connected with the braking means and touching said conductor, a rubbing carriage contact on the carriage adapted to touch stationary contacts, and in combination with each section of conductor a holding relay energized through the carriage contact of an arriving carriage, a connection of a section of conductor with a current supply comprising a switch closed by the energizing of this relay in series with a switch opened by the energizing of the corresponding relay of the section next ahead, a non-holding relay energized with this second relay and closing a switch in parallel with the said opened switch.

5. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, a rubbing carriage contact on the carriage adapted to touch stationary contacts, and in combination with each section of conductor a holding relay energized through the carriage contact of an arriving carriage, a non-holding relay energized with it, a holding coil for the holding relay in series with a switch on it and with a switch momentarily opened on the release of the non-holding relay of the section next ahead by the current in a second holding coil also in series with it.

6. Apparatus for sorting or marshalling vehicles comprising, a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electrical conductor in sections on the track, a brush on the carriage, electrically connected with the braking means and touching said conductor, movable track points, switch means for making or breaking a connection between each conductor section and a current supply controlled by the passage of a carriage on to or beyond the section and, where the track divides, controlled also by the movement of the track points.

7. Apparatus for sorting or marshalling vehicles comprising a carriage adapted to pass any vehicle with which it is not engaged, means adapted to engage it temporarily with a vehicle, braking means adapted to arrest the carriage and the vehicle engaged with it, a track adapted to guide the carriage to a position abreast of an unsorted vehicle and away from a sorted vehicle, a rubbing carriage contact on the carriage adapted to touch stationary contacts, switches and rubbing contacts adapted to connect the carriage contact with a potential point on an electric supply circuit corresponding to the path the vehicle is to follow, and means comprising a stationary contact adapted to actuate the braking means if the carriage contact is not connected with the potential point corresponding to the path.

8. Apparatus for sorting or marshalling vehicles comprising a carriage adapted to pass any vehicle with which it is not engaged, means adapted to engage it temporarily with a vehicle, braking means adapted to arrest the carriage and the vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, a rubbing carriage contact on the carriage adapted to touch stationary contacts, switches and rubbing contacts adapted to connect the carriage contact with a potential point on an electric supply circuit corresponding to the path the vehicle is to follow, and means comprising a stationary contact and a relay adapted to connect or disconnect a section of conductor with a current supply according to the potential point to which the carriage contact is connected.

9. Apparatus for sorting or marshalling vehicles comprising a carriage adapted to pass any vehicle with which it is not engaged, means adapted to engage it temporarily with a vehicle, braking means adapted to arrest the carriage and the vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, a rubbing carriage contact on the carriage adapted to touch stationary contacts, switches and rubbing contacts adapted to connect the carriage contacts with a potential point on an electric supply circuit corresponding to the path the vehicle is to follow, and relays which connect a section of conductor with the current supply only if the coil of each such relay joins a particular potential point through the carriage contact with another potential point on the same electric supply circuit.

10. Apparatus for sorting or marshalling vehicles comprising a carriage adapted to pass any vehicle with which it is not engaged, means adapted to engage it temporarily with a vehicle, braking means adapted to arrest the carriage and the vehicle engaged with it, a track adapted to guide the carriage abreast of an unsorted vehicle and away from a sorted vehicle, an electrical conductor in sections on the track, a brush on the carriage electrically connected with the braking means and touching said conductor, switch means for making or breaking the connection between each conductor section and current supply controlled by the passage of a carriage on to or beyond the section and which in the case of a number of tracks joining a common track comprises a switch connecting the final section of a conductor in any of the tracks with a current supply, means for displacing this switch controlled by a carriage arriving at a section of a common track from another of the tracks, and means for preventing this displacement controlled by another carriage arriving at and not passing beyond any section of this track.

11. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage abreast of an unsorted vehicle and away from a sorted vehicle, an electrical conductor in sections on the track, a brush on the carriage electrically connected with the braking means and touching said conductor, switch means for making or breaking a connection between each conductor and current supply operated by the passage of a carriage on to or beyond the section and, in the case of a number of tracks joining a common track, comprising a switch connecting the final section of a conductor in any of the tracks with the current supply, means for displacing this switch controlled by an electric circuit including a switch closed by a carriage arriving at a section of the common track from another of the tracks in series with a switch in each section of this track opened by a carriage arriving at such section and not passing beyond it.

12. Apparatus for sorting or marshalling vehicles comprising a carriage adapted to pass any vehicle with which it is not engaged, means adapted to engage it temporarily with a vehicle, braking means adapted to arrest the carriage and the vehicle engaged with it, a track adapted to guide the carriage to a position abreast of an unsorted vehicle and away from a sorted vehicle, an electric conductor in sections on the track, a brush on the carriage electrically connected with the braking means and touching said conductor, switch means for making or breaking a connection between each conductor section and current supply controlled by the passage of a carriage on to or beyond the section and, in the case of a number of tracks joining a common track, comprising a switch connecting the current supply with the final section of the conductor in any of the tracks, means for displacing the switch from connection with one final section to connection with another in rotation controlled by every carriage that passes beyond any final section on to the common track.

13. Apparatus for sorting or marshalling vehicles, comprising a carriage adapted to pass any vehicles with which it is not engaged, means adapted to engage it temporarily with a vehicle, braking means adapted to arrest the carriage and vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, switch means for making or breaking a connection between each conductor section and a current supply controlled by the passage of a carriage on to or beyond the section, a rubbing carriage contact on the carriage adapted to touch stationary contacts and which, in the case of a number of tracks joining a common track, comprises a switch connecting the current supply with the final section of conductor in any of the tracks, means for displacing this switch controlled by an electric circuit closed and opened by a relay energized and deenergized by every carriage contact touching and passing a contact at the end of each final section.

14. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, switch means for making or breaking a connection between each conductor section and the current supply controlled by the passage of a carriage on to or beyond the section, and means for propelling the carriage by power.

15. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electrical conductor in sections on the track, a brush on the carriage electrically connected with the braking means and touching said conductor, switch means for making or breaking a connection between each conductor section and the current supply controlled by the passage of a carriage on to or beyond the section, means for propelling the carriage by power, movable points at the junctions, and parts on the carriage adapted according to their arrangement to set the points at the junctions.

16. Apparatus for sorting or marshalling vehicles comprising a carriage adapted to pass any vehicle with which it is not engaged, means adapted to engage it temporarily with a vehicle, braking means adapted to arrest the carriage and a vehicle engaged with it, a track adapted to guide the carriage to a position abreast of an unsorted vehicle and away from a sorted vehicle, an electric conductor in sections on the track, a brush on the carriage electrically connected with the braking means and touching said conductor, switch means for making or breaking a connection between each conductor section and the current supply controlled by the passage of a carriage on to or beyond the section, a rubbing carriage contact on the carriage adapted to touch stationary contacts, switches and rubbing contacts on the carriage adapted to connect a carriage contact with a potential point on an electric supply circuit corresponding to the path the vehicle is to follow, and where the track divides, movable track points, a point setting device, and relays energized through the stationary contacts when touched by the carriage contact and controlling both the point setting device and the connection with current supply of the conductor sections according to the potential point with which the carriage contact is connected.

In testimony whereof I have signed my name to this specification.

ROBERT EDWARD STOPFORD VENABLES.